United States Patent
Hockaday et al.

(10) Patent No.: US 6,630,266 B2
(45) Date of Patent: Oct. 7, 2003

(54) DIFFUSION FUEL AMPOULES FOR FUEL CELLS

(75) Inventors: Robert G. Hockaday, Los Alamos, NM (US); Patrick S. Turner, Los Alamos, NM (US); Marc D. DeJohn, Los Alamos, NM (US); Carlos J. Navas, Santa Fe, NM (US); Heathcliff L. Vaz, Los Alamos, NM (US); L. Luke Vazul, Los Alamos, NM (US)

(73) Assignee: Manhattan Scientifics, Inc., Los Alamos, NM (US)

( * ) Notice: Subject to any disclaimer, the term of this patent is extended or adjusted under 35 U.S.C. 154(b) by 241 days.

(21) Appl. No.: 09/821,053

(22) Filed: Mar. 30, 2001

(65) Prior Publication Data

US 2001/0049045 A1 Dec. 6, 2001

Related U.S. Application Data

(60) Provisional application No. 60/193,265, filed on Mar. 30, 2000.

(51) Int. Cl.[7] .............................................. H01M 8/04
(52) U.S. Cl. .............................. 429/34; 429/39; 429/12
(58) Field of Search .............................. 429/19, 34, 12, 429/17, 39; 422/236, 239; 48/198.2, DIG. 5, 61

(56) References Cited

U.S. PATENT DOCUMENTS

| | | | |
|---|---|---|---|
| 3,649,360 A | | 3/1972 | Bloomfield et al. |
| 4,750,923 A | * | 6/1988 | Haruta et al. ................. 55/319 |
| 4,931,168 A | | 6/1990 | Watanabe et al. |
| 5,364,711 A | | 11/1994 | Yamada et al. |
| 5,432,023 A | | 7/1995 | Yamada et al. |
| 5,436,086 A | | 7/1995 | Seymour et al. |
| 5,500,292 A | | 3/1996 | Muranaka et al. |
| 5,631,099 A | | 5/1997 | Hockaday |
| 5,743,943 A | * | 4/1998 | Maeda et al. ................. 96/126 |
| 5,759,712 A | | 6/1998 | Hockaday |
| 5,833,934 A | | 11/1998 | Adlhart |
| 5,928,745 A | | 7/1999 | Wood et al. |
| 6,054,228 A | | 4/2000 | Cisar et al. |
| 6,057,051 A | | 5/2000 | Uchida et al. |

OTHER PUBLICATIONS

Kong et al., *Development of hydrogen storage for fuel cell generators*, International Journal of Hydrogen Energy, 24 (1999) pp. 665–675; Elsevier Science Ltd. (No month).

Greenwood et al., *Chemistry of the Elements*; Chapter 3, pp. 43 and 44 (No date).

Amendola et al.; *An ultrasafe hydrogen generator: aqueous, alkaline borohydride solutions and Ru catalyst*; Journal of Power Sources 85 (2000) pp. 186–189; Elsevier Science Ltd. (No month).

Davis & Gottbrath; *Boron Hydrides V. Methanolysis of Sodium Borohydride*; Methanolysis of Sodiiiiium Borohydride; Mar. 20, 1962; pp. 895–897.

* cited by examiner

*Primary Examiner*—John S. Maples
(74) *Attorney, Agent, or Firm*—James C. Wray; Meera P. Narasimhan

(57) ABSTRACT

A fuel ampoule for fuel cells delivers fuel by diffusion through the ampoule walls. The fuel ampoule is stored in a fuel impermeable container. These ampoules used with small low power fuel cells need a steady controlled uniform delivery of vaporous fuel such as alcohols. This fueling system avoids the leakage problems of liquid fuel, and may be easily packaged for small compact fuel cell systems.

24 Claims, 3 Drawing Sheets

DIFFUSION FUEL AMPOULES FOR FUEL CELLS

This application claims the benefit of Provisional Application Ser. No. 60/193,265 filed Mar. 30, 2000.

BACKGROUND OF THE INVENTION

Fuel cells directly transform chemical energy to electrical energy by reacting electrochemically gas or liquids in the presence of an electrolyte, electrodes and a catalyst. Our previous patents, U.S. Pat. No. 4,673,624 "Fuel Cell", U.S. Pat. No. 5,631,099 "Surface Replica Fuel Cell, and U.S. Pat. No. 5,759,712 "Surface Replica Fuel Cell for Micro Fuel Cell Electrical Power Pack", describe a method of forming a fuel cell that efficiently utilizes expensive catalysts, is easily mass produced, and can be packaged for portable electronics. A co-pending patent application, U.S. Ser. No. 09/208,745 (now U.S. Pat. No. 6,326,097), describes how the Micro-Fuel Cells™ can be packaged in portable electronics. A co-pending patent application, U.S. Ser. No. 09/210,792 (now U.S. Pat. No. 6.194.095), describes how the non-bipolar fuel cells can be packaged to form larger power supplies.

Applications of a small fuel cell include those devices currently powered by batteries, especially the rechargeable batteries. By directly utilizing alcohol fuels, the fuel cells can have higher energy per unit mass, higher energy per unit volume, be more convenient for the energy user, environmentally less harmful, and less expensive than conventional batteries.

RELATED ART

U.S. Pat. No. 5,364,711 and U.S. Pat. No. 5,432,023 describe miniature fuel cells to run "office automation (OA) equipment, audio equipment, and radio equipment." Those patents describe the advantages of using miniature fuel cells built by a variety of techniques. They also describe a wick to introduce liquid fuel and electrolyte to the fuel cell and remove excess water from the fuel.

There are four fundamental problems of the wicking of input fuel and water in low power fuel cells. The first problem in delivering the methanol fuel to the fuel cell as a solution of sulfuric acid and methanol is the risk of shorting non-bipolar cells in a single membrane type fuel cell.

The second problem in low power applications is retaining water and maintaining water balance in the electrolyte. A mechanism for recovering water from the air electrode and recycling it back to the fuel electrode is not described in this patent. If water could be recovered it would allow the fuel cell to run on highly concentrated methanol. A wicking system alone may not be able to recover water if there is no condensed water.

The third problem is that by using a wicked delivery of fuel, impurities in the fuel are delivered to the fuel cell electrodes. The fourth problem is that, with a wicking system, physical liquid contact with the fuel reservoir and the wick needs to be made. This liquid contact and flow can be disturbed by gravitational orientation of the fuel source or poor mating of the fuel reservoir to the wick.

In our U.S. Pat. No. 5,631,099, water circulating and regulating membranes over the electrodes and water recovery from the exhaust are described. This patent uses wicking to recover the water and recycle it back to the fuel electrode. In our U.S. Pat. No. 5,759,712, a vapor phase transport to a hydrophilic outer surface of a gas manifold is described. Selectively permeable membranes in proximity to the fuel cell are described for delivering reactants and products. Fueling is done by breaching a fuel tank and wicking fuel, which is then in the vapor phase transported to the fuel cells. This fuel tank breaching can lead to spilling of fuel while liquid contact needs to be maintained with the fuel in the fuel tank. Thus, as the fuel tank runs low on fuel some of the fuel may not be in liquid contact and will be unused.

To achieve wicking fuel delivery, the fuel needs to be fluid and mobile thus increasing the possibilities of leakage from the fuel ampoule. Gravity can affect the delivery of a liquid fuel. Achieving a good liquid seal on a methanol fuel can lead to complex and costly sealing mechanisms for the fueling system and the fuel cell system. Small leaks of liquid fuel compared to vapor loss through the same hole can have a far greater detrimental effect on the air electrode and total fuel loss.

In U.S. Pat. No. 4,931,168 a gas permeable electrode is described that is in contact with a methanol fuel. Its purpose is to prevent buildup of carbon dioxide bubbles on the fuel cell electrode. It uses a gas permeable resin and catalytic particle electrodes that allow reactants and ions to move in and out of the electrodes. The gas permeable membrane does not provide a means of transporting the fuel from the fuel source to the fuel cell.

In our co-pending patent application, U.S. Ser. No. 09/208,745 (now U.S. Pat. No. 6.326.097), the fuel cell and fueling ampoules are shown being placed in proximity to each other with a diffusion mat. The fuel tanks are described as a liquid wick or fluid motion fueling. Fuel diffusion from the fuel tanks is not described. Plastic blister packaging of the fuel tanks does not indicate the sealing properties of the package, nor individual sealing. Porous fillers are described as being in the fuel tanks, but not as a diffusion delivery means.

The present invention addresses existing problems.

SUMMARY OF THE INVENTION

The present invention includes a fuel tank that is permeable to the fuel and a container that is fuel impermeable for fuel storage. This system of fueling is used when small low power fuel cells need a steady controlled delivery of fuel. This fueling system is simple and may be easily packaged to be small compact fuel cell systems. There are several features that make this system enhance the performance of the fuel cell system.

We have discovered in building and testing these devices that some of the volatile hydrocarbons and hydrogen can diffuse through container walls at a sufficient rate that physical contact is not necessary. The fuel can also have impurities in it that would not be vaporized or transported through the container material thus protecting the fuel cell. We also discovered that some of the fuels in high concentrations can have debilitating effects on the fuel cells. Thus by devising a refueling scheme that avoids breaching containers and vapor fuel delivery, we found that safer and more convenient power devices may be realized.

The invention includes a fueling system having the fuel ampoules sealed in gas tight packages. When the package is opened the ampoule is inserted into the fuel cell application to deliver reactants through the selectively permeable wall of the ampoule. This permits a controlled release of fuel, keeps the fuel that is delivered to the fuel cells clean and avoids fuel spillage by the user, thus making small alcohol powered fuel cells practical.

Concentration Gradients

When fuel, such as concentrated methanol, is held behind a selectively permeable membrane, such as silicone rubber, and placed near a fuel cell gas manifold two concentration gradients are set up as the fuel cell consumes the fuel: concentration of fuel from high, at the fuel ampoule, to low, through the fuel cell; and concentration of the water from high, at the oxygen electrode of the fuel cell, to low, at the fuel tank.

These concentration gradients set up vapor pressure gradients also. Both have the effect of drawing fuel out of the fuel tank and drawing water from the oxygen electrode. Thus, it has the effect of recapturing product water from the air electrode and the fuel cells can run on highly concentrated methanol fuel.

Selectively Permeable Membranes

By having a selectively permeable fuel tank wall, such as silicone rubber, the fuel delivery has the advantageous effect of delivering fuel at a constant rate throughout its life cycle. If the membrane had similar permeability to fuel compared to water, the water would be diffusing in while the fuel was diffusing out. The water would drop the fuel vapor pressure and reduce the rate at which fuel can diffuse out. Thus, the rate of fuel delivery would gradually drop and the fuel tank would gradually fill with a mixture of fuel and water.

In product applications it is desirable to have the membrane be effectively much more permeable to fuel compared to water. Thus, it is a "one-way" diffusion process and the rate would not change until the fuel tank is emptied of fuel. Our measurements on silicone rubber membranes show a molecular diffusion rate difference for methanol over water of 20 to 36 times. In performance tests with a small ampoule containing 95% methanol with a silicone rubber membrane the fuel delivery system is effective in delivering fuel with only a small fraction of the original fuel volume left as water in the fuel container.

The fuel tank may be permeable to carbon dioxide exhaust from the fuel electrode. The fuel tank may be designed to serve multiple functions, not only for diffusing fuel to the fuel cell but also removing products such as carbon dioxide through the fuel ampoule. An arrangement to do this may include a fuel tank that has two sides: a fuel and exhaust permeable side, and an air side that is selectively permeable to the exhaust gas only.

The vapor fuel delivery and selective permeability of the ampoule also have the effect of filtering the fuel. Additives such as dyes, flame colorizers and bitterants may be added to the fuel to make the fuel safer and possibly aesthetically pleasing to the consumers. Water absorbing chemicals may be added to the fuel to maintain the vapor pressure of the fuel. The interior of the tank may have a filler that has a higher fuel diffusion rate to fuel than the walls but keeps liquid fuel from being accessible even if the fuel tank is ruptured or crushed, such as cellulose sponge.

Selective Permeability Temperature Response

The permeability of the fuel ampoule may vary with temperature. This property of increasing permeability with temperature is used to match the fuel cell consumption rate as the temperature increases. The permeability rate may also be chosen to not rise as much as the fuel cell consumption rate to keep the fuel cell at higher temperatures using more fuel than necessary. This may be the case in power applications where the power delivery is constant regardless of the temperature environment.

Mixed fuels, Additives, Per-evaporation, and Filtration

Mixed fuels such as methanol, formaldehyde, formic acid and water may be used in the fuel ampoule. If these additives are permeable through the fuel ampoule they are also delivered with their respective rates and concentration gradients. Volatile mineral acids such as sulfuric acid depending the compatibly with the fuel cell and fuel ampoule may be used. The fuel ampoule material may also be chosen or designed by a mixture of materials to have a permeability that allows the fuel to be delivered at the rate ratio matching that of the fuel. Such as, but not limited to, an ampoule wall material that has a 1:1 diffusion rate for methanol over water. Thus, if fueled by a 1:1 fuel mixture, the diffusion delivery, assuming a low exterior concentration of both, would deliver fuel at a 1:1 concentration.

The process of enhancing the selective vaporization of fuel from a membrane is called per-evaporation. It essentially increases the evaporation of that fuel. Thus the ampoule membrane uses this effect when the fuel concentration is low. It keeps the fuel concentration higher at the fuel cell than it would be without the fuel ampoule selectively permeable barrier.

The molecular filtration may be used to keep impurities that may be dissolved in the fuel or come with the fuel to be left in the fuel ampoule. This feature may be used to allow a fuel of low purity and the fuel cells are protected.

Non-contact Fueling

By using the diffusion delivery of fuel from an ampoule the fuel does not need to make physical contact with the fuel cell. This reduces the liquid fuel contact effects on the fuel cells where some electrolytes soften and dissolve. In series fuel cell arrays, if liquid fuel and electrolytes cover across cell gaps, shunting of the cells results in losses from the fuel cell arrays. Fluid contact on the fuel cell electrodes damages the fragile structures. Covering the fuel cell electrodes with fluid may also block product removal and fresh reactants from reaching the surface of the electrodes.

By simply being able to remove the fuel tank from a sealed container and slide it into a chamber without alignment necessities, a system with large dimensional tolerances, where the user may close the cover, is very simple, convenient and low error prone. The feature of being able to open the fueling system repeatably with only vaporous fuel leakage is a safety feature and very forgiving for the consumer.

Mechanical Fuel Tank Fluid Level Indicators

The fuel tank as it uses fuel, if it has selective fuel delivery, may mechanically collapse. This fuel tank collapse may be used to form a mechanical fuel status indicator. A color stripe may be used that moves by a viewing window on the fuel ampoule. The fuel tank itself may be tinted to give a visual indication of fuel level. The fuel may have colored dyes so that as the fuel is used it will give a color change indication of fuel status since the remaining fuel will be darker. The fuel ampoule may also have materials, such as salts, that come out of solution as the fuel is used and produce an opaque interior or a color change in the fuel ampoule.

Selective Properties Tank Walls and Composite Ampoule Construction

The tank walls may be made of composite materials. Examples are fiberglass cloth and silicone rubber, where the fiberglass cloth gives mechanical strength and the silicone rubber has high diffusion rate properties. The mechanical and diffusion properties of the fuel tanks may be adjusted to reflect the blend of materials. The tanks may be made in layers.

An exemplary design has an outer layer with the highest diffusion resistance and a single fuel such as methanol, with the interior having rapid diffusion. This gives the fuel delivery a flat output with time, matching the vapor pressure of the fuel liquid, and then a steep decline as the remaining vapor diffuses out of the interior materials and voids.

Electrical and mechanical diffusion control may be incorporated into the fuel ampoule or between the fuel ampoule and the fuel cell. These are used to allow the membrane diffusion to have a feedback mechanism to adjust to fuel consumption demands by the fuel cell, or to different environmental conditions around the cell. Mechanisms include ionic-drag drawing fuel through a membrane, piezoelectric operating of micro apertures in the membrane, or impermeable membranes that act as apertures which may be adjusted to specific opening path between the fuel ampoule and the fuel cell.

Storage Container Properties

The storage container of the permeable fuel container needs to be impermeable to the fuel. This container may be a disposable bag with metal coatings or coatings such as ACLAR™ PVDF polyvinylidene fluoride plastic. This tank may also be made of composite materials, such as PET plastic polyethylene terephthalate with a ACLAR™ coating. The storage container may be a heat sealed bag with a tear point to allow the consumer to easily open the container, like those of packages for foods and ink jet cartridges.

Simple Capillary Tube Gas Exhaust Line

In a fuel cell running on methanol there is a carbon dioxide exhaust. In our previous patents, U.S. Pat. No. 5,631,099 and U.S. Pat. No. 5,759,712, the carbon dioxide exhaust can diffuse out through a selectively permeable membrane or the fuel tank itself. We have found that a simple gaseous diffusion route such as capillary tube may effectively exhaust product gases and maintain gas pressure equilibrium across the fuel cells. The capillary tube may also function as a controlled leak for the beneficial in-leakage of oxygen to the fuel electrode.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
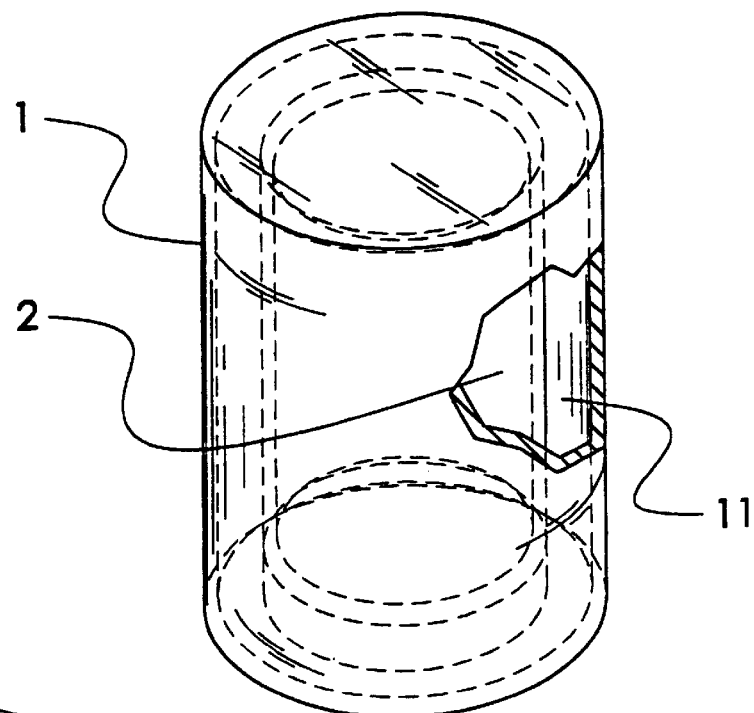
FIG. 1 shows the main container.

In FIG. 1, the fuel ampoule 2 is shown contained in an outer gas impermeable container 1. The outer container 1 is preferably made of a material such as, but not limited to, polyethylene or polyester film plastic that is heat sealed around the ampoule 2.

Figure 2:
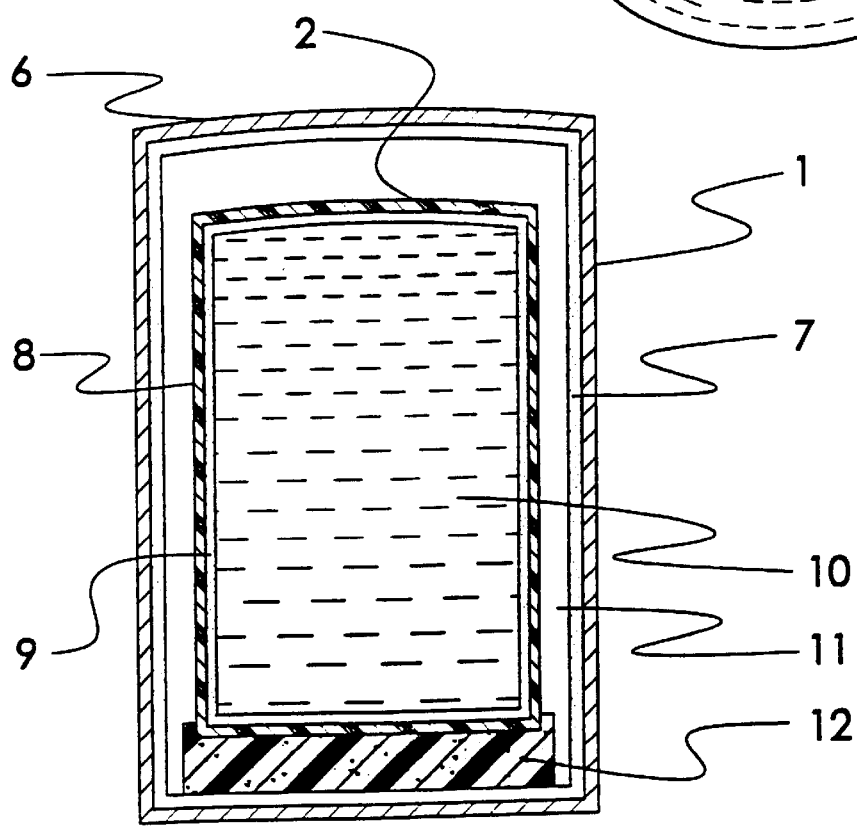
FIG. 2 is a cross-sectional view of the fuel ampoule and the outer container.

In FIG. 2 the fuel ampoule 2 is shown with methanol 10 filling the interior of the fuel ampoule 2. The interior of the fuel ampoule may be filled with an open cell foam 10, such as polyurethane open cell foam or jelly to reduce the accessibility of the methanol in the event that the ampoule wall is breached. The ampoule wall 8, 9 may be constructed from pure silicone rubber.

The thickness of the silicone rubber may be chosen to deliver fuel at the rate needed by the fuel cells. The silicone rubber diffuses methanol out at a rate approximately 35 times that of the water diffusing in. Thus, this selective permeability means that the methanol diffuses out while very little water diffuses in. This feature keeps the vapor pressure of the methanol in the ampoule constant throughout the use of the ampoule fuel which in turn keeps the fuel vapor delivery constant.

Other variations of the fuel ampoule design includes forming the ampoule walls out of a porous material 8 such as fiberglass cloth or porous polyester film that gives it mechanical strength. These walls are impregnated or coated 9 with a silicone rubber that seals the porous material and gives it the selective permeability for methanol over water. A variety of materials and layers may be used as the selective permeable membrane 9 to tune the membrane's selectivity. In general, the fuel cell has a high concentration of water and the ampoule has a high concentration of methanol. Thus, to maintain a steady diffusion of methanol to the fuel cell and not have a build up of water in the ampoule 2, methanol diffusion dominates the ampoule wall diffusion.

The ampoule 2 is shown contained within the outer gas impermeable container 1. This container may include two components; a structural material 6 and a sealing material 7. The structural material 6 may be a plastic material that is easily heat sealed such as polyester or polyethylene plastic to form a bag around the ampoule 2. The inner surface of the structural material 6 may have a methanol impermeable coating 7 on it such as, but not limited to, polychlorotrifluorethylene to block methanol and diffusion. The outer container 1 may be a steel or an aluminum can. A support material 12 may be inserted between the walls of the outer can or container 1 and the ampoule 2 to provide padding.

Figure 3:
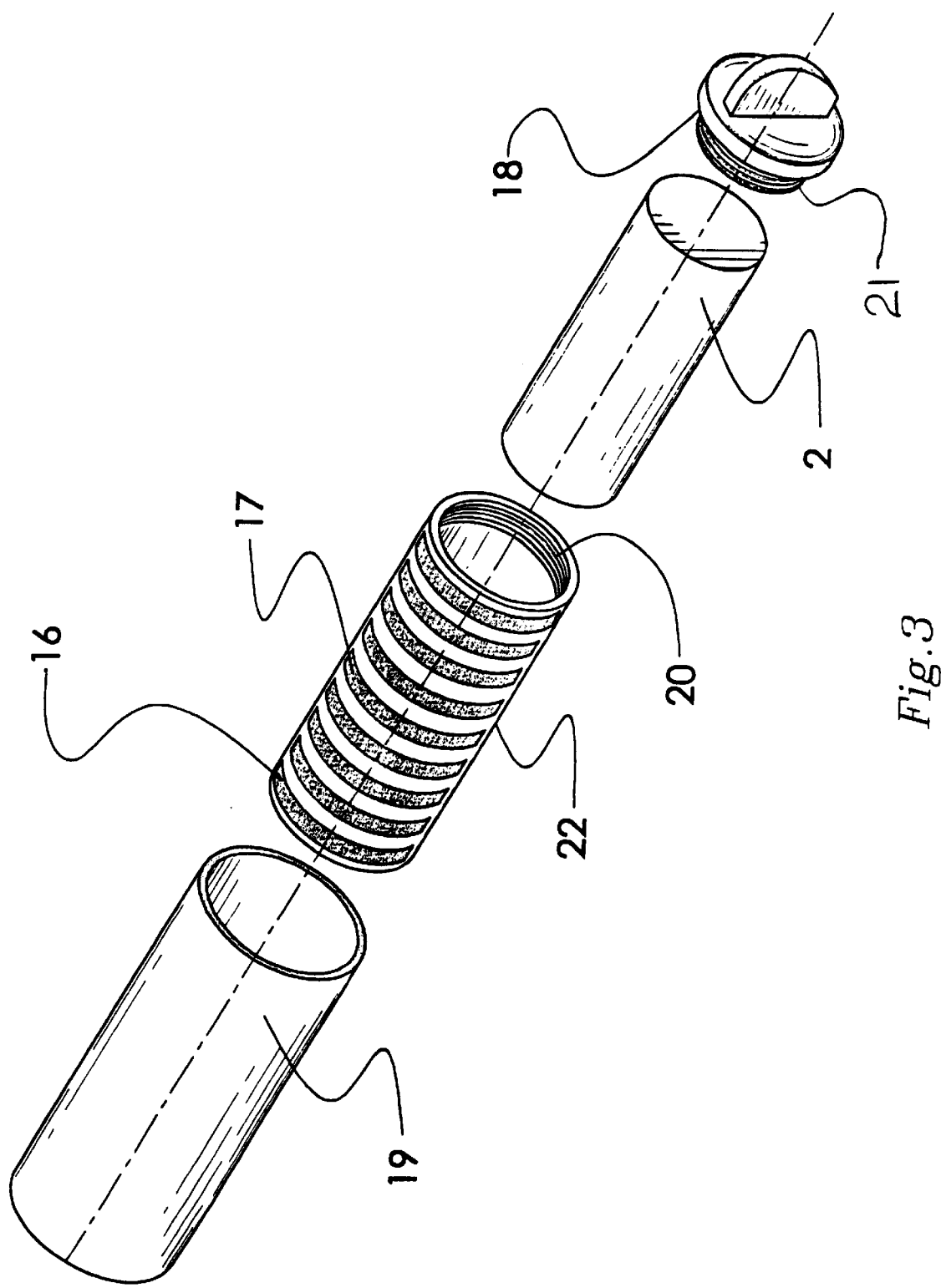
FIG. 3 shows the fuel ampoule and fuel cell assembly in an exploded view.

In FIG. 3, the fuel ampoule 2 is shown in an exploded view being inserted into a fuel cell manifold 22. In this particular design there is an end cap 18 that, once screwed into the fuel cell threads 20, makes a near gas tight seal. To provide pressure relief from altitude changes and exhaust of carbon dioxide from the fuel cell manifold, the end cap 18 may have a spiral groove 21 cut in the seal to create a very long diffusion path to the atmosphere. The fuel cell array 17 is built into the fuel manifold 22. The electrical connections are made onto the end cap 18 and the back of the fuel manifold 16. To protect the fuel cells 17 and provide air manifolding to the fuel cells, an outer porous gas manifold tube 19 covers the fuel cell arrays. These fuel cells 17 may be built according to the methods of U.S. Pat. No. 5,631,099 and U.S. Pat. 5,759,712.

Figure 4:
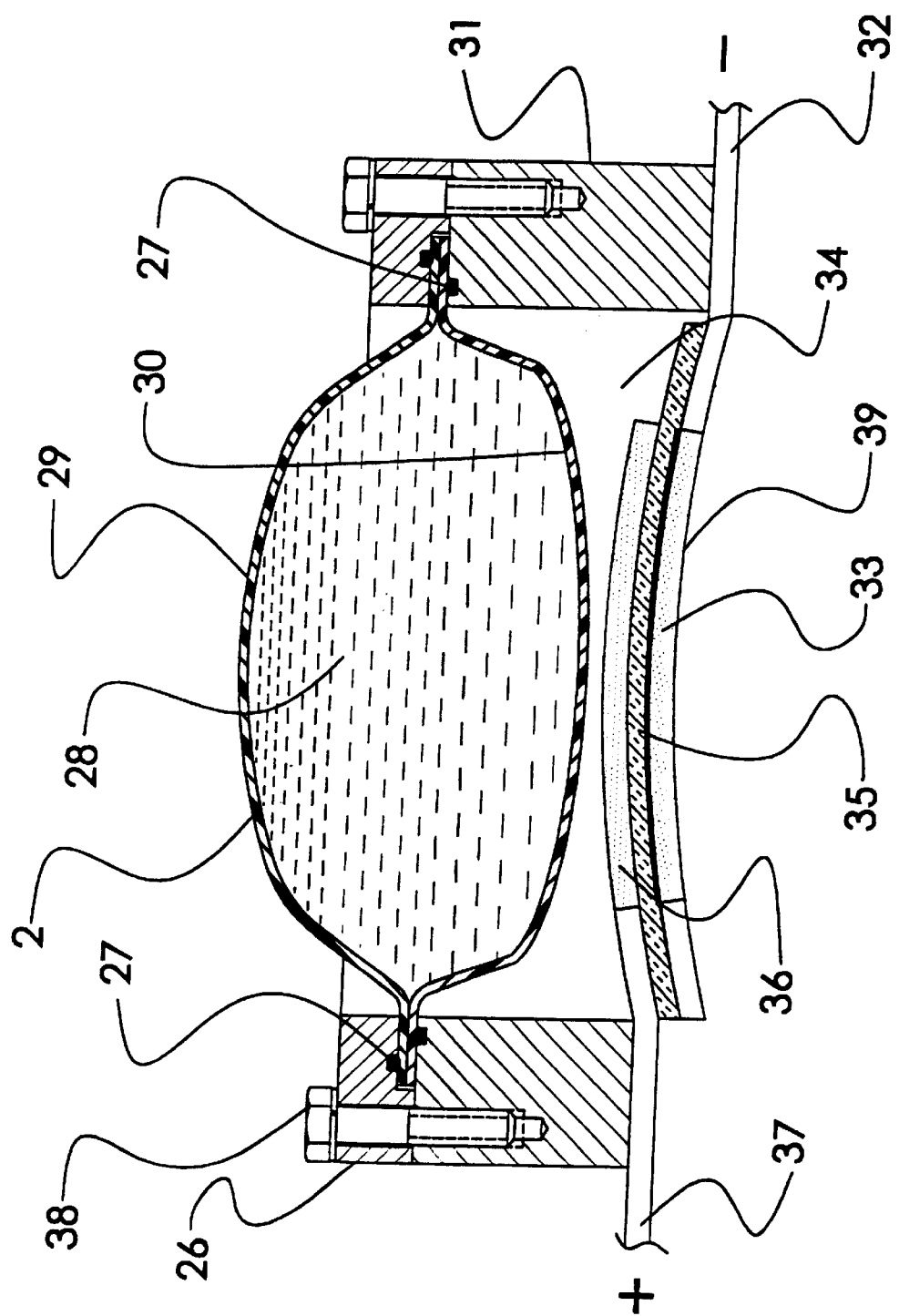
FIG. 4 shows a double selective fuel ampoule.

In FIG. 4, a fuel ampoule 2, that has two different diffusion walls, is shown in a cross-sectional view. This particular design uses an outer wall 29 of the ampoule 2 that is selectively permeable to carbon dioxide and blocks methanol. One example of a material for this membrane is polypropylene. The inner ampoule wall 30 is a silicone rubber membrane that selectively lets methanol diffuse through to the fuel cell.

The fuel ampoule 2 is filled with methanol and an exemplary filler material such as cotton 28. The fuel ampoule 2 is clamped by a polyethylene clamp 26 and frame 31 and secured with bolts 38. O-ring seals 27 are used to seal the fuel ampoule 2 to make the fueling manifold 34 gas tight over the fuel cell or fuel cell array 39. The fuel cell array 39 is heat sealed onto the frame 31. The basic fuel cell array 39 may be formed by the methods of U.S. Pat. No. 5,631,099 and U.S. Pat. No. 5,759,712. The fundamental components include air current collector 32, air electrode 33, electrolyte and substrate 35, fuel electrode 36, and fuel current electrode 37.

While the invention has been described with reference to specific embodiments, modifications and variations of the invention may be constructed without departing from the scope of the invention, which is defined in the following claims.

We claim:

1. A fueling system apparatus for fuel cells comprising a fuel tank having walls permeable to fuel, and a fuel container having walls impermeable to fuel for receiving and storing the fuel tank, further comprising a fuel diffusion manifold comprising a fuel cell, the fuel tank provided proximal the fuel cell, and a cover on the fuel cell restricting or excluding air exchange with the fuel cell.

2. The apparatus of claim 1, wherein the fuel tank is removably provided in the fuel container.

3. The apparatus of claim 1, further comprising an elongated small diameter channel in the cover for diffusing exhaust products, providing pressure relief and providing oxygen to the fuel cell.

4. The apparatus of claim 1, further comprising a fuel.

5. The apparatus of claim 4, wherein the fuel is a hydrogen bearing fuel including hydrogen.

6. The apparatus of claim 1, wherein the walls of the fuel tank comprises a material having selective permeability to different molecular species.

7. The apparatus of claim 1, wherein the fuel tank is a fuel ampoule, wherein the fuel tank is selectively permeable to fuel and exhaust products of the fuel cell, and wherein the fuel diffuses to the fuel cell and the exhaust products diffuse through the fuel ampoule to the atmosphere.

8. The apparatus of claim 7, wherein the fuel ampoule comprises additives for absorbing the products of the fuel cell.

9. The apparatus of claim 8, wherein the additives in the fuel ampoule absorb water and/or carbon dioxide.

10. The apparatus of claim 8, wherein the additives in the fuel ampoule cause an appearance change indicating a quantity of fuel in the fuel ampoule.

11. The apparatus of claim 8, wherein the additives in the fuel ampoule enhance performance of the fuel cell.

12. The apparatus of claim 8, wherein the additives are selected from a group consisting of water, hydrogen producing compound, acids, and combinations thereof.

13. The apparatus of claim 8, wherein an appearance of the fuel ampoule changes as fuel is consumed.

14. The apparatus of claim 8, wherein the selective permeability of the ampoule is a temperature dependent permeability for feeding the fuel cell at an optimum rate at different temperatures.

15. The apparatus of claim 8, further comprising electrical adjustments for adjusting fuel diffusion from the fuel ampoule.

16. The apparatus of claim 8, further comprising mechanical adjustments for adjusting fuel diffusion from the fuel ampoule.

17. The apparatus of claim 8, wherein the additives are formic acids.

18. The apparatus of claim 1, wherein the walls of the fuel tank comprise layers of or composite materials.

19. The apparatus of claim 1, wherein the walls of the fuel container comprises composite materials.

20. The apparatus of claim 19, wherein the walls of the fuel container comprises layers of composite materials.

21. The apparatus of claim 1, further comprising a fuel diffusion plenum having fuel therein in the fuel diffusion manifold.

22. A fueling system for fuel cells comprising a fuel tank having walls permeable to fuel, and a fuel container having walls impermeable to fuel for receiving and storing the fuel tank, further comprising a fuel, wherein the fuel is methanol.

23. A fueling system for fuel cells comprising a fuel tank having walls permeable to fuel, and a fuel container having walls impermeable to fuel for receiving and storing the fuel tank, wherein the walls of the fuel tank comprises a material having selective permeability to different molecular species, wherein the material has a higher selective permeability for fuel over water.

24. A fueling system for fuel cells comprising a fuel tank having walls permeable to fuel, and a fuel container having walls impermeable to fuel for receiving and storing the fuel tank, wherein the walls of the fuel tank comprises silicone rubber for allowing higher permeability of methanol over water.

\* \* \* \* \*